UNITED STATES PATENT OFFICE.

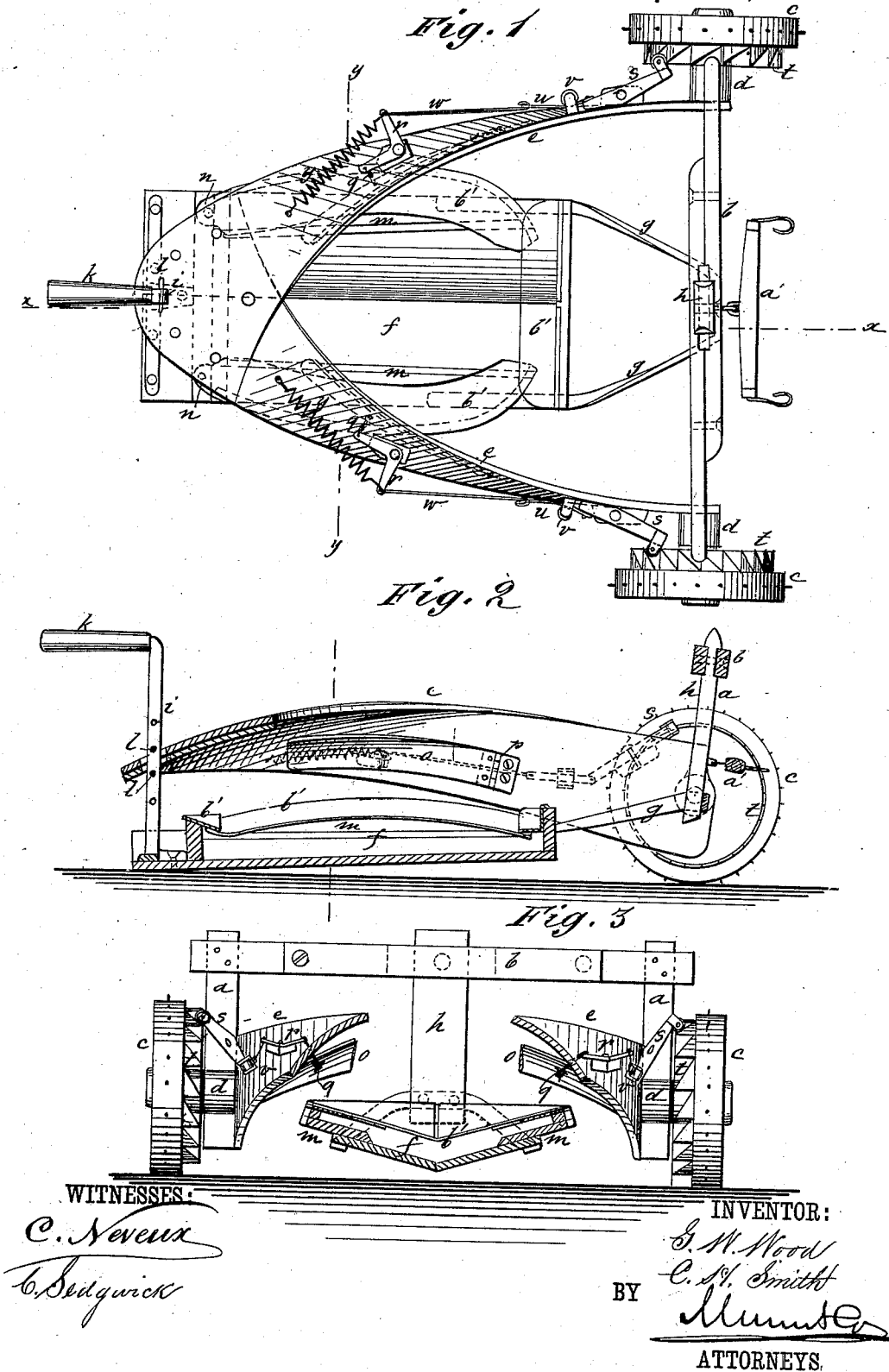

GEORGE W. WOOD AND CHARLES H. SMITH, OF FARIBAULT, MINNESOTA.

IMPROVEMENT IN APPARATUS FOR REMOVING AND COLLECTING BUGS FROM VINES.

Specification forming part of Letters Patent No. 214,478, dated April 15, 1879; application filed September 16, 1878.

*To all whom it may concern:*

Be it known that we, GEORGE W. WOOD and CHARLES H. SMITH, of Faribault, in the county of Rice and State of Minnesota, have invented a new and Improved Trap for Potato-Bugs, of which the following is a specification.

The object of our invention is to furnish an apparatus for ridding potato-vines of the Colorado beetle or potato-bug, by removing them from the vines and gathering them into a receptacle.

Our invention consists in an apparatus mounted on wheels which is drawn between the rows of plants, and by suitably-shaped wings gathers the plants into a bunch and shakes them, thereby shaking off the beetles into a receptacle, from which they cannot escape. The parts of the apparatus are adjustable to suit the height of the plants.

In the accompanying drawings, Figure 1 is a plan of our apparatus. Fig. 2 is a longitudinal section at the line $x\,x$. Fig. 3 is a cross-section at the line $y\,y$.

Similar letters of reference indicate corresponding parts.

$a\,a$ are vertical standards, connected together by a cross-bar, $b$, at their upper ends. $c\,c$ are wheels mounted on short axles fitted in the boxes $d$ at the lower ends of standards $a$.

The standards $a$ are at such a distance apart that the wheels $c$ will run between the rows of plants and two rows of plants be between the wheels.

The cross-bar $b$ is made in two pieces, as shown, connected together by screws, so that the bar can be adjusted according to the width of the rows.

$e\,e$ are wings, one at each side of the apparatus. The forward ends of the wings are attached to the standards $a$, and their rear ends are connected together at the center line of the machine. These wings $e$ are of suitable width, and they are attached with their edges vertical at the forward end, and are twisted so as to lie flat where they are connected together at the rear end.

$f$ is a pan-shaped receptacle, attached by arms $g$ to a bar, $h$, that is suspended from bar $b$, midway between the wheels $c$. $i$ is a vertical rod rising from the rear end of the receptacle $f$, and passing through a hole in the ends of wings $e$.

The upper end of rod $i$ is provided with a handle, $k$, by which the rear end of the machine may be manipulated.

There are holes in rod $i$, into which pins $l\,l$ may be inserted to retain the rear ends of the wings $e$ at the desired height, according to the growth of the plants.

The strips $m$, that form the sides of the receptacle $f$, are pivoted by pins $n$ at one end, so that the receptacle can be made wider or the reverse, according to the width of the rows.

At the inner side of the wings $e$, and projecting over the receptacle $f$, are flappers $o\,o$, hinged at $p$. Each of these flappers $o$ has a rod, $q$, passing through the wing, that the flapper is hinged to, and connected with a crank-lever, $r$, hung at the outside of the wing.

$s$ is a lever, fulcrumed at the forward end of the wing in such position that one end of the lever $s$ is acted upon by the teeth $t$, attached to the inner side of wheel $c$. The other end of lever $s$ is connected by a strap, $u$, that passes beneath a roller, $v$, to a rod, $w$, that is attached to crank-lever $r$.

$y$ is a spring connected to lever $r$ and to the wing $e$.

The teeth $t$ depress the lever $s$, and draw upon the crank-lever $r$ and spring $y$, and draw the flapper outward; but as soon as the lever $s$ clears the tooth the flapper springs out quickly. The arrangement is the same on both flappers $o$, and by that means a series of rapid blows are given upon vines gathered by the wings.

A horse is to be attached to the whiffletree $a'$, that is hung on the bar $h$. The horse will walk between the two rows of plants that are to be operated upon by the apparatus, and the receptacle $f$ will run on the ground between the rows.

As the apparatus is drawn forward the plants pass beneath the bar $b$, one row at each side of the bar $h$ and pan $f$, and the rows will be gathered together and bent down beneath the wings $e$. The flappers $o$ will shake the plants, and the beetles will be rubbed and shaken off into the receptacle $f$.

We provide a projecting rim, $b'$, of metal, around the edges of the receptacle $f$, which prevents the bugs from getting out of the receptacle.

By the use of the above-described apparatus potato-vines may be quickly and effectually cleared of beetles or other insects without injury to the plants.

Having described our invention, we claim as new and desire to secure by Letters Patent—

The combination, with a wheeled vehicle, of the twisted wings $e\ e$, provided with vertical forward ends attached to standards $a$ and flat rear ends connected together, the suspended intermediate subjacent pan $f$, and the hinged flappers $o$, projecting over the receptacle, as and for the purpose specified.

GEORGE WESTON WOOD.
CHARLES HORACE SMITH.

Witnesses:
FRANK A. DAVIS,
P. CUDMORE.